(12) United States Patent
Telschow et al.

(10) Patent No.: US 12,552,402 B2
(45) Date of Patent: Feb. 17, 2026

(54) METHOD AND DEVICE FOR AUTOMATICALLY RECORDING A DRIVING TRAJECTORY

(71) Applicant: Bayerische Motoren Werke Aktiengesellschaft, Munich (DE)

(72) Inventors: Daniel Telschow, Munich (DE); Rebecca Pascal, Munich (DE); Benjamin Krimmer, Munich (DE); Benedikt Hoffmann, Munich (DE); Mohamad Mounir El Dana, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 126 days.

(21) Appl. No.: 18/411,191

(22) Filed: Jan. 12, 2024

(65) Prior Publication Data

US 2024/0239362 A1 Jul. 18, 2024

(30) Foreign Application Priority Data

Jan. 13, 2023 (DE) ..................... 10 2023 100 745.9

(51) Int. Cl.
*B60W 50/14* (2020.01)
*B60W 50/00* (2006.01)
*B60W 50/02* (2012.01)

(52) U.S. Cl.
CPC ........ *B60W 50/14* (2013.01); *B60W 50/0205* (2013.01); *B60W 2050/0005* (2013.01);
(Continued)

(58) Field of Classification Search
CPC ............. B60W 50/14; B60W 50/0205; B60W 2050/0005; B60W 2050/021; B60W 2050/146; B60W 2520/10
See application file for complete search history.

(56) References Cited

U.S. PATENT DOCUMENTS

| | | | | |
|---|---|---|---|---|
| 5,928,294 A | * | 7/1999 | Zelinkovsky | ........ G05D 1/0293 318/587 |
| 6,334,344 B1 | * | 1/2002 | Bonhoure | ................ G08G 5/53 244/190 |

(Continued)

FOREIGN PATENT DOCUMENTS

| | | | | |
|---|---|---|---|---|
| CN | 200968986 Y | * | 10/2007 | |
| CN | 113173163 A | * | 7/2021 | .......... B60W 40/107 |

(Continued)

OTHER PUBLICATIONS

German Search Report issued in German Application No. 10 2021 100 745.9 dated Sep. 21, 2023 with partial English translation (12 pages).

*Primary Examiner* — Chico A Foxx
(74) *Attorney, Agent, or Firm* — Crowell & Moring LLP

(57) ABSTRACT

A device for recording a driving trajectory of a vehicle is disclosed. The device is configured to have the effect of automatically recording the driving trajectory of the vehicle during a journey of the vehicle and to check whether an information state is present or not. The device is also configured to detect degradation of the automatic recording of the driving trajectory of the vehicle during the journey of the vehicle, and to output degradation information relating to the degradation of the automatic recording of the driving trajectory of the vehicle when the information state is present.

10 Claims, 2 Drawing Sheets

(52) U.S. Cl.
 CPC . *B60W 2050/021* (2013.01); *B60W 2050/146* (2013.01); *B60W 2520/10* (2013.01)

(56) References Cited

U.S. PATENT DOCUMENTS

| | | | | |
|---|---|---|---|---|
| 11,332,069 | B1* | 5/2022 | Qi | G09F 13/16 |
| 11,492,012 | B2* | 11/2022 | Lally | B62D 15/0285 |
| 11,801,859 | B2* | 10/2023 | Tzempetzis | G08G 1/162 |
| 12,337,827 | B2* | 6/2025 | Prinzhausen | B60W 30/143 |
| 2009/0055936 | A1* | 2/2009 | Eberstaller | G06F 21/34 |
| | | | | 726/28 |
| 2016/0039413 | A1* | 2/2016 | Eichhorn | B60W 30/0956 |
| | | | | 701/26 |
| 2018/0053415 | A1* | 2/2018 | Krunic | G08G 1/096833 |
| 2019/0360831 | A1* | 11/2019 | Liu | G05D 1/0221 |
| 2022/0080970 | A1 | 3/2022 | Guenzel et al. | |
| 2022/0274588 | A1* | 9/2022 | Marek | B60W 30/06 |
| 2024/0067223 | A1* | 2/2024 | Krishnan | B62D 15/0285 |

FOREIGN PATENT DOCUMENTS

| | | | | |
|---|---|---|---|---|
| DE | 102011109492 A1 * | 2/2013 | | B60W 50/0098 |
| DE | 10 2013 015 349 A1 | 4/2014 | | |
| DE | 10 2013 201 799 A1 | 8/2014 | | |
| DE | 10 2020 206 942 A1 | 12/2021 | | |
| DE | 10 2020 211 461 A1 | 3/2022 | | |
| JP | 2020075655 A * | 5/2020 | | B60W 50/08 |

* cited by examiner

METHOD AND DEVICE FOR AUTOMATICALLY RECORDING A DRIVING TRAJECTORY

CROSS REFERENCE TO RELATED APPLICATION

This application claims priority under 35 U.S.C. § 119 from German Patent Application No. 10 2023 100 745.9, filed Jan. 13, 2023, the entire disclosure of which is herein expressly incorporated by reference.

BACKGROUND AND SUMMARY

The invention relates to a method and a corresponding device which are configured to assist the user of a vehicle in repeating driving maneuvers.

A vehicle may have an assistance function which allows the user of the vehicle to record and store in memory a driving trajectory driven during manual driving operation. The stored driving trajectory can be used at a later point in time to guide the vehicle automatedly along the stored driving trajectory. As a result, the convenience of the vehicle with respect to repeating driving maneuvers can be increased.

Optionally, the user must explicitly start the recording of a driving trajectory. As an alternative, it is possible (for example on the basis of a ring memory) to have the effect of automatically recording a section of a driving trajectory without it being necessary to explicitly start the recording. In this respect, the automatic recording is typically restricted to a given maximum storable driving distance owing to the limited storage capacity of the ring memory.

The present document is concerned with the technical object of increasing the convenience for a vehicle user in automatically recording and/or storing a driving trajectory.

The object is achieved by each of the independent claims. Advantageous embodiments are described inter alia in the dependent claims. It is pointed out that additional features of a patent claim dependent on an independent patent claim, without the features of the independent patent claim or in combination only with a subset of the features of the independent patent claim, may form a standalone invention that is independent of the combination of all of the features of the independent patent claim and may be made into the subject matter of an independent claim, a divisional application or a subsequent application. This applies in the same way to technical teachings that are described in the description and may form an invention independent of the features of the independent patent claims.

One aspect describes a device for recording a driving trajectory of a (motor) vehicle. The device is configured to have the effect of automatically recording the driving trajectory of the vehicle during a journey of the vehicle. During the journey, the longitudinal and/or transverse guidance of the vehicle can be brought about manually by the driver. The driving trajectory of the vehicle can be recorded on a ring memory of the vehicle (wherein the ring memory is cyclically overwritten during the journey when the driving trajectory is longer than the maximum storable driving distance of the ring memory). The driving trajectory of the vehicle can be recorded without the user, in particular the driver, of the vehicle using the user interface of the vehicle to make a request for (explicit and/or dedicated) recording of the driving trajectory of the journey.

The device may, for example, be configured to detect that the driving speed of the vehicle is the same as or less than a (recording) speed threshold value during the journey of the vehicle. In response to this, it is then possible to have the effect that the driving trajectory of the vehicle is automatically recorded. The automatic recording of the driving trajectory can thus be triggered by the (low) driving speed of the vehicle.

The device is also configured to check whether (during the journey of the vehicle) an information state is present or not. It is possible to take sensor data from one or more sensors of the vehicle as a basis for determining whether the user, in particular the driver, of the vehicle is aware (or is not aware) that the driving trajectory of the vehicle is being automatically recorded. It is possible to determine that the information state is present when it is determined that the user of the vehicle is aware that the driving trajectory of the vehicle is being automatically recorded. On the other hand, a decision can be made that the information state is not present.

The device may be configured to check whether the information state is present or not on the basis of one or more information conditions. The one or more information conditions can be checked repeatedly, in particular periodically, during the journey of the vehicle. As soon as a certain combination of one or more information conditions is met, it can be determined that the information state is present. As soon as a decision is made that the information state is present, the presence of the information state through to the end of the journey of the vehicle can be maintained.

Exemplary information conditions are:
a condition to the effect that the vehicle speed of the vehicle is the same as or less than a certain speed threshold value (which is the same as or less than the recording speed threshold value);
a condition to the effect that the journey of the vehicle is in a spatial region which has one or more parking spaces for the vehicle (this being detected, for example, on the basis of a digital map of the road network traveled by the vehicle);
a condition to the effect that the user of the vehicle during the journey has made a user input on the user interface of the vehicle (for example has opened a parking panel) relating to the parking of the vehicle; and/or
a condition to the effect that the vehicle has or reaches a certain navigation destination (where the vehicle is typically parked).

A check can therefore be made as to whether the user is occupied with parking the vehicle (and the user is therefore probably aware that the trajectory is being automatically recorded). This knowledge can then be taken as a basis to make a decision that the information state is present.

The device is also configured to detect degradation of the automatic recording of the driving trajectory of the vehicle during the journey of the vehicle. It is possible in particular to detect degradation of the automatic recording of the driving trajectory of the vehicle that has the result that the driving trajectory cannot be stored or at least cannot completely be stored for subsequent use on a memory unit of the vehicle (wherein the memory unit is different than the ring memory).

The degradation of the automatic recording of the driving trajectory of the vehicle can be detected on the basis of one or more degradation conditions. In particular, a check can be made as to whether one or more degradation conditions are met (which leads to degradation of the automatic recording). Exemplary degradation conditions are: a condition to the effect that the vehicle speed of the vehicle is the greater than a (degradation) speed threshold value (which is possibly greater than the recording speed threshold value);

a condition to the effect that a maximum permissible steering angle and/or a maximum permissible inclination of the vehicle is exceeded during the journey;

a condition to the effect that sensor data from at least one sensor, in particular a surroundings sensor (for instance a camera) and/or a position sensor (for instance a GNSS receiver), of the vehicle are impaired during the journey;

a condition to the effect that a trailer has been or is connected to the vehicle before or during the journey;

a condition relating to the wheel slip of a wheel of the vehicle during the journey; and/or a condition relating to impairment of the on-board electrical system and/or the communications network of the vehicle during the journey.

In addition, the device is configured to output degradation information relating to the degradation of the automatic recording of the driving trajectory of the vehicle when (in particular only if) the information state is present. In this respect, it is possible to output degradation information that informs the user of the vehicle that the driving trajectory of the journey cannot be stored (on the memory unit of the vehicle).

On the other hand, the output of the degradation information can be prevented and/or it is possible to output no degradation information when the information state is not present.

It is therefore possible, within the scope of the automatic recording of a driving trajectory, to selectively output degradation information if it was detected and/or determined beforehand that the information state is present (for which it is to be expected that the user of the vehicle is aware of the automatic recording of the driving trajectory). On the other hand, it is possible to omit the output of degradation information. The convenience of recording a driving trajectory efficiently and reliably can thus be increased.

The device may be configured to determine that the vehicle has reached the end position (in particular the parked end position, PEP) of the journey (for example because the vehicle is stationary and/or because the drive motor of the vehicle is switched off). In response to the determination that the vehicle has reached the end position of the journey, it is possible (using the user interface) to output an offer to store the automatically recorded driving trajectory when no degradation of the automatic recording of the driving trajectory of the vehicle during the journey was detected (and possibly only if the information state is present). The user of the vehicle can accept this offer, the result of which is the permanent storage of the driving trajectory on the memory unit of the vehicle. The stored driving trajectory can then be selected by the user for a subsequent journey, in order to have the effect of automatic longitudinal and/or transverse guidance of the vehicle along the stored driving trajectory. Particularly convenient recording and storage of a driving trajectory can thus be brought about.

On the other hand, it is possible to output the degradation information (only) as a response to the determination that the vehicle has reached the end position of the journey when degradation of the automatic recording of the driving trajectory of the vehicle during the journey was detected and when the information state is present. This allows the convenience to be further increased.

Another aspect describes a (road) motor vehicle (in particular a passenger vehicle or a commercial vehicle or a bus or a motorcycle) that comprises the device described in this document.

Another aspect describes a method for recording (and possibly for storing) a driving trajectory of a vehicle. The method comprises having the effect of automatically recording the driving trajectory of the vehicle during a (manual) journey of the vehicle and checking (during the journey) whether an information state is present or not. The method also comprises detecting degradation of the automatic recording of the driving trajectory of the vehicle during the journey of the vehicle. In addition, the method comprises outputting degradation information relating to the degradation of the automatic recording of the driving trajectory of the vehicle when (in particular only if) the information state is present.

Another aspect describes a software (SW) program. The SW program may be set up to be executed on a processor (for example on a controller of a vehicle) in order thereby to execute the method described in this document.

Another aspect describes a storage medium. The storage medium may comprise an SW program that is configured to be executed on a processor and to thereby carry out the method described in this document.

It should be noted that the methods, devices and systems described in this document may be used both on their own and in combination with other methods, devices and systems described in this document. Furthermore, any aspects of the methods, devices and systems described in this document may be combined with one another in a wide variety of ways. The features of the claims may in particular be combined with one another in a wide variety of ways. Furthermore, features in parentheses are to be understood as optional features.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
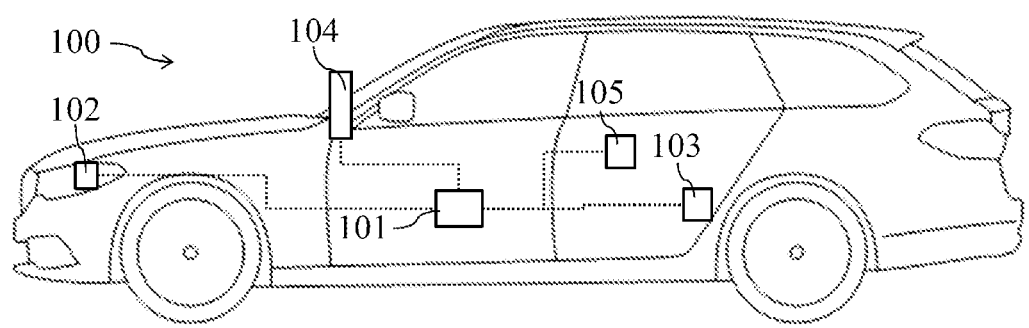
FIG. 1 shows exemplary components of a vehicle.

As set out in the introduction, the present document is concerned with increasing the convenience for a user of a vehicle in recording a driving trajectory for repeating a driving maneuver. In this connection, FIG. 1 shows an exemplary vehicle 100 having one or more surroundings sensors 102 (for example at least one camera, at least one radar sensor, at least one lidar sensor, at least one ultrasound sensor, etc.) which are each configured to record surroundings data (i.e. sensor data) relating to the surroundings of the vehicle 100. A control device 101 of the vehicle 100 can be configured to evaluate the surroundings data, in order to detect one or more objects in the surroundings of the vehicle 100.

The device 101 may also be configured to operate one or more longitudinal and/or transverse guidance actuators 103 of the vehicle 100 (for example a drive motor, a brake device and/or a steering device) in order to automatedly longitudinally and/or transversely guide the vehicle 100. The one or more actuators 103 can be operated on the basis of the surroundings data, in particular on the basis of the one or more detected objects.

The vehicle 100 may also comprise a user interface 104, which enables interaction between the user and the vehicle 100, for example in order to activate or deactivate a driver assistance function and/or to inform the user about the status of a driver assistance function. The user interface 104 may comprise one or more operating elements and/or one or more output elements (for example a screen).

The vehicle 100 may have a driver assistance function designed to record a driving trajectory traveled by the vehicle 100. The driving trajectory can be traveled manually by the driver of the vehicle 100 and/or automatedly by the vehicle 100. Trajectory data relating to the driving trajectory can be stored in a memory unit 105 of the vehicle 100. The trajectory data can, for a multiplicity of positions along the driving trajectory, display in each case:
- coordinates of the respective position (for example relative to a world coordinate system and/or relative to a coordinate system of the vehicle 100);
- an orientation and/or alignment of the vehicle 100 at the respective position;
- a vehicle speed of the vehicle 100 at the respective position;
- one or more objects in the surroundings of the vehicle 100; and/or
- the distance between the vehicle 100 and the one or more objects in the surroundings of the vehicle 100.

The user of the vehicle 100 can explicitly start and/or stop the recording of a driving trajectory (using the user interface 104). It is thus possible to precisely define the starting point and/or the end point of the stored driving trajectory. On the other hand, what can happen is that the user forgets to start the recording of the driving trajectory, with the result that driving maneuver associated with the driving trajectory must be carried out again in order to record the driving trajectory.

The device 101 may be configured to have the effect of automatically recording a driving trajectory (without it being necessary for the user to explicitly start the recording). The automatic recording can be restricted to a given maximum storable driving distance (for instance between x=50 and 200 meters). For example, the device 101 may be configured to store the last x meters of a driving trajectory in a ring memory of the vehicle 100, wherein the first section of a stored driving trajectory is overwritten by the last section of the driving trajectory as soon as the maximum storable driving distance is overwritten.

Figure 2:
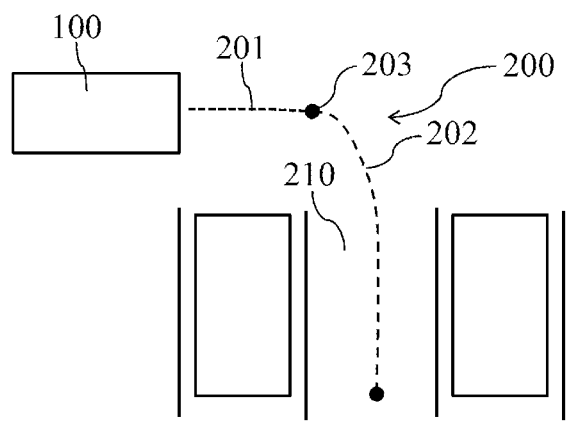
FIG. 2 shows an exemplary automatically recorded driving trajectory.

FIG. 2 shows an exemplary driving situation in which the vehicle 100 travels along a driving trajectory 200 into a parking space 210. In the process, the respective last-traveled section of the driving trajectory 100 can be automatically stored, with the result that, after the vehicle 100 has been turned off at an end position in the parking space 210, the last-traveled section 202 of the driving trajectory 100 is stored in the ring memory of the vehicle 100. The stored section 202 of the driving trajectory 100 possibly corresponds to the maximum storable driving distance. The section 201 of the driving trajectory 200 that comes before the stored section 202 typically cannot be stored (and was overwritten by the stored section 202 during the journey of the vehicle 100).

The automatically stored section 202 of the driving trajectory 200 can be stored in the memory unit 105 (on the user's initiative) and can be used for repeating the driving maneuver associated with the driving trajectory 200. For example, when the driving maneuver is being repeated, the vehicle 100 can be automatedly driven from the starting point 203 of the stored section 202 of the driving trajectory 200 into the parking space 210. As an alternative, it is possible (in order to provide a reversing assistance function) to take the stored trajectory data for the section 202 of the driving trajectory 200 as a basis for bringing about at least partially automated reverse travel (for example with automated transverse guidance and with automated or manual longitudinal guidance) along the section 202 of the driving trajectory 200 (for example in order for the vehicle 100 to pull out of the parking space 210).

The automatic recording of the driving trajectory 200 can be brought about or prevented on the basis of one or more recording conditions. One exemplary recording condition is that the driving speed of the vehicle 100 is the same as or less than a predefined (recording) speed threshold value. The automatic recording can be started automatically when (possibly only if) it is detected that the one or more recording conditions are met.

While the driving trajectory 200 is being automatically recorded, degradation of the recording can occur as soon as at least one degradation condition is met. An effect of the degradation of the recording can be that the driving trajectory 200 is not recorded or is at least not completely recorded and/or cannot be stored or cannot be completely stored. Exemplary degradation conditions are:
- the driving speed of the vehicle 100 is greater than a predefined speed threshold value (which is possibly greater than the speed threshold value of the recording condition to avoid instabilities);
- the steering angle of the vehicle 100 is (in absolute terms) greater than a steering angle threshold value;
- the inclination of the roadway traveled by the vehicle 100 is (in absolute terms) greater than an inclination threshold value;
- the surroundings data from at least one surroundings sensor 102 (for example a camera) are impaired;
- the sensor data from the position sensor (in particular the GNSS (global navigation satellite system) receiver) of the vehicle 100 are impaired;
- the connection or the presence of a trailer to or on a trailer coupling of the vehicle 100;
- there is a wheel or tire slip in relation to the roadway traveled by the vehicle 100;
- (partial) superposition or closure of a parking-related menu item (for instance a parking panel) of the user interface 104 of the vehicle 100; and/or
- an error and/or signal failure of an on-board electrical system and/or communications network of the vehicle 100.

The device 101 may be configured to have the effect of outputting information to the user (via the user interface 104) when there is degradation of the automatic recording of the driving trajectory 200. It is thus possible to increase convenience regarding the automatic recording, at least if the user is aware and/or the user desires for the driving trajectory 200 to be automatically recorded. On the other hand, the output of such degradation information can be perceived as annoying if the user was not aware at all that the driving trajectory 200 was being automatically recorded.

The device 101 may be configured to check, while the driving trajectory 200 is being automatically recorded and/or owing to the degradation of the automatic recording, whether an information state for the output of degradation information is present or not. The degradation information can be output when (possibly only if) the information state is present. On the other hand, the output of the degradation information can be prevented when the information state is not present.

It is possible to determine that the information state is present when one or more information conditions are met. Exemplary information conditions are
- the driving speed of the vehicle 100 is the same as or less than a predefined speed threshold value (which can correspond, for example, to the speed threshold value of the recording condition);
- the vehicle 100 is in a region with one or more parking spaces 210 (this can, for example, be detected on the basis of the sensor data from the position sensor and on the basis of a digital map relating to the roadway network traveled by the vehicle 100); and/or
- the user has made a user input on the user interface 105 that relates to the parking of the vehicle 100 (for example, the user might have selected a menu item with a list of stored driving trajectories 200); and/or
- the vehicle 100 has reached a given navigation destination (for example a given address, for instance a private address or an office) or approaches a given navigation destination.

It is thus possible (on the basis of the one or more information conditions) to make a prediction as to whether the user wishes to use the automatic recording of the driving trajectory 200 or not. If a prediction is made that the user wishes to use the automatic recording, it can be determined that the information state is present. On the other hand, it can be determined that the information state is not present.

The output of the degradation information owing to degradation of the automatic recording of the driving trajectory 200 can be effected when (possibly only if) it is detected that the information state is present. Particularly convenient use of the automatic recording can thus be brought about.

As set out in the introduction, the vehicle 100 may have a function which allows the driver of the vehicle 100 to explicitly train the route 200 of the vehicle 100 into and/or out of a parking space 210 from or to a selected point. The stored route 200 can then be traveled by the vehicle 100 automatically between the selected point and the parking space 210 at the driver's request. Typically, multiple routes 200 can be trained and stored within the scope of the function.

The vehicle 100 may also have a function in which it is not necessary to explicitly start the recording of the route 200, and the recording is automatically ended after reaching the parking end position (PEP). The last x meters before the PEP is reached can be stored and can then be used to carry out the driving maneuver again. The route 200 can be stored in a ring memory during the recording. After the PEP is reached, an offer can be made to the user via the user interface 104 to store the automatically recorded route 200 permanently in the memory unit 105 (outside the ring memory). The offer to store the automatically recorded route 200 is possibly only output if there was no degradation of the automatic recording beforehand.

As set out in this document, the device 101 may be configured to communicate the degradation of the automatic recording to the user of the vehicle 100 by way of information when (in particular as soon as) a predefined combination of one or more (information and/or parking) conditions are met. Exemplary conditions are: speed below a threshold value, parking panel in the user interface 104 open, vehicle 100 in a "parkable" region, etc. The user can thus be informed that it is not possible to store an automatically recorded driving trajectory 200 owing to the degradation. Exemplary degradation conditions for the degradation of the automatic recording are: maximum permissible steering angle exceeded, maximum permissible inclination of the roadway exceeded, blocked camera, no GPS signal, etc.

The vehicle 100 may, for example, be in a region where there might be a parking operation (it being possible to ascertain this on the basis of navigation data). The vehicle can also drive below a predefined speed limit. In addition, it can be detected that the parking panel was opened automatically and/or proactively. This can be taken as a basis to determine that the information state is present. When a recording limit (and the degradation caused thereby) is exceeded, information that the storage of the driving trajectory 200 is not possible or has become impossible can be output to the user before or when the vehicle stops (or reaches the PEP).

Figure 3:
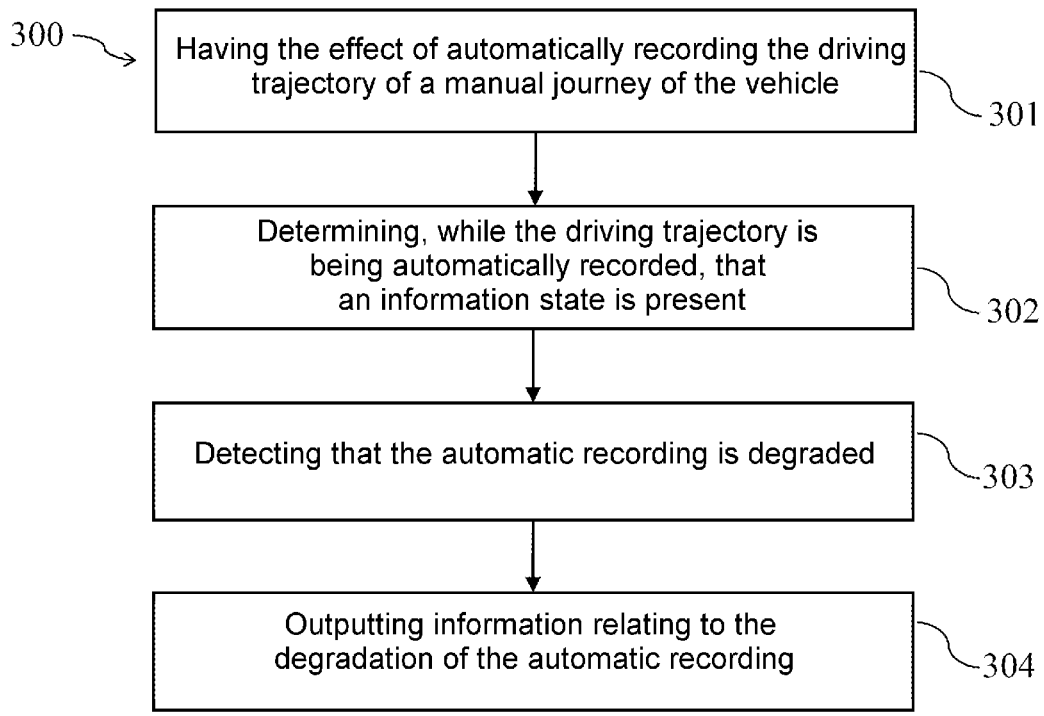
FIG. 3 shows a flow diagram of an exemplary method for automatically recording a driving trajectory of a vehicle.

FIG. 3 shows a flow diagram of a (possibly computer-implemented) method 300 for recording a driving trajectory 200 of a vehicle 100. The method 300 comprises having the effect 301 that the driving trajectory 200 of the vehicle 100 is recorded automatically (for example in a ring memory) during a (manual) journey of the vehicle 100. The recording of the driving trajectory 200 can be brought about without the user of the vehicle 100 explicitly requesting the recording (via the user interface 104) specifically for the journey of the vehicle 100.

The method 300 also comprises checking 302 (during the journey and/or while the driving trajectory 200 is being automatically recorded) whether an information state is present or not. One or more information conditions can be checked for this purpose. The one or more information conditions can be checked repeatedly. It is possible to determine that the information state is present when (in particular as soon as) a given combination of information conditions is met. The information state can then be present until the end of the journey of the vehicle 100.

In addition, the method 300 comprises detecting 303 degradation of the automatic recording of the driving trajectory 200 of the vehicle 100 during the journey of the vehicle 100. It is possible in particular to detect that the automatic recording of the driving trajectory 200 is degraded such that the driving trajectory 200 cannot be stored or cannot be completely stored (in a memory unit 105 for permanent storage).

The method 300 also comprises outputting 304 degradation information relating to the degradation of the automatic recording of the driving trajectory 200 of the vehicle 100 when (in particular only if) the information state is present.

The measures described in this document make it possible to increase convenience regarding the recording and storage of a driving trajectory 200 for repeating a driving maneuver efficiently and reliably.

The present invention is not restricted to the exemplary embodiments shown. In particular, it should be noted that the description and the figures are intended to illustrate the principle of the proposed methods, devices and systems only by way of example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for recording a driving trajectory of a vehicle, comprising:
a control device operatively configured to:
automatically record the driving trajectory of the vehicle during a journey of the vehicle;
check, based on one or more information conditions, whether an information state is present or not;
detect, based on one or more degradation conditions, degradation of the automatic recording of the driving trajectory of the vehicle during the journey of the vehicle; and
output degradation information relating to the degradation of the automatic recording of the driving trajectory of the vehicle when the information state is present,
wherein the one or more information conditions are different from the one or more degradation conditions.

2. The device according to claim 1, wherein the control device is further configured to:
prevent the output of the degradation information, and/or output no degradation information,
when the information state is not present.

3. The device according to claim 1,
wherein the one or more information conditions include:
a condition to the effect that a driving speed of the vehicle is the same as or less than a speed threshold value;
a condition to the effect that the journey of the vehicle is in a spatial region which has one or more parking spaces for the vehicle;
a condition to the effect that a user of the vehicle during the journey has made a user input on a user interface of the vehicle relating to the parking of the vehicle; or
a condition to the effect that the vehicle has or reaches a certain navigation destination.

4. The device according to claim 1, wherein the control device is further configured to:
take sensor data from one or more sensors of the vehicle as a basis for determining whether a user of the vehicle is aware that the driving trajectory of the vehicle is being automatically recorded; and
determine that the information state is present when it is determined that the user of the vehicle is aware that the driving trajectory of the vehicle is being automatically recorded.

5. The device according to claim 1,
wherein the one or more degradation conditions include:
a condition to the effect that a driving speed of the vehicle is greater than a speed threshold value;
a condition to the effect that a maximum storable driving distance of the driving trajectory of the vehicle is exceeded;
a condition to the effect that a maximum permissible steering angle and/or a maximum permissible inclination of the vehicle is exceeded during the journey;
a condition to the effect that sensor data from a surroundings sensor and/or a position sensor, of the vehicle are impaired during the journey;
a condition to the effect that a trailer has been or is connected to the vehicle before or during the journey;
a condition relating to a wheel slip of a wheel of the vehicle during the journey; or
a condition relating to impairment of an on-board electrical system and/or a communications network of the vehicle during the journey.

6. The device according to claim 1, wherein the control device is further configured to:
detect a degradation of the automatic recording of the driving trajectory of the vehicle resulting in the driving trajectory not being storable for subsequent use on a memory unit of the vehicle; and
output degradation information which informs a user of the vehicle that the driving trajectory of the journey cannot be stored.

7. The device according to claim 1, wherein the control device is further configured such that, during the journey of the vehicle:
the driving trajectory of the vehicle is automatically recorded on a ring memory of the vehicle; and/or
the driving trajectory of the vehicle is recorded without a user of the vehicle using a user interface of the vehicle to make a request for the driving trajectory of the journey to be recorded.

8. The device according to claim 1, wherein the control device is further configured to:
detect that a driving speed of the vehicle is the same as or less than a speed threshold value during the journey of the vehicle; and
as a response to the detecting, have the effect that the driving trajectory of the vehicle is automatically recorded.

9. The device according to claim 1, wherein the control device is further configured to:
determine that the vehicle has reached an end position of the journey; and
(i) as a response to the determination that the vehicle has reached the end position of the journey, output the degradation information when degradation of the automatic recording of the driving trajectory of the vehicle during the journey was detected and when the information state is present; or
(ii) as a response to the determination that the vehicle has reached the end position of the journey, output an offer to store the automatically recorded driving trajectory when no degradation of the automatic recording of the driving trajectory of the vehicle during the journey was detected.

10. A method for recording a driving trajectory of a vehicle, the method comprising:
automatically recording the driving trajectory of the vehicle during a journey of the vehicle;
checking, based on one or more information conditions, whether an information state is present or not;
detecting, based on one or more degradation conditions, degradation of the automatic recording of the driving trajectory of the vehicle during the journey of the vehicle; and
outputting degradation information relating to the degradation of the automatic recording of the driving trajectory of the vehicle when the information state is present,
wherein the one or more information conditions are different from the one or more degradation conditions.

* * * * *